United States Patent
Syrovy (10) Patent No.: US 9,989,033 B2
(45) Date of Patent: Jun. 5, 2018

(54) HORIZONTAL AXIS WIND OR WATER TURBINE WITH FORKED OR MULTI-BLADE UPPER SEGMENTS

(71) Applicant: George J. Syrovy, Centerville, MA (US)

(72) Inventor: George J. Syrovy, Centerville, MA (US)

(*) Notice: Subject to any disclaimer, the term of this patent is extended or adjusted under 35 U.S.C. 154(b) by 778 days.

(21) Appl. No.: 14/217,695

(22) Filed: Mar. 18, 2014

(65) Prior Publication Data

US 2014/0271216 A1    Sep. 18, 2014

Related U.S. Application Data

(60) Provisional application No. 61/798,952, filed on Mar. 15, 2013, provisional application No. 61/953,515, filed on Mar. 14, 2014.

(51) Int. Cl.
| | |
|---|---|
| *F03D 1/06* | (2006.01) |
| *F03D 1/02* | (2006.01) |
| *F03B 17/06* | (2006.01) |

(52) U.S. Cl.
CPC .......... *F03D 1/0633* (2013.01); *F03B 17/061* (2013.01); *F03D 1/025* (2013.01); *F05B 2210/16* (2013.01); *F05B 2240/24* (2013.01); *F05B 2240/34* (2013.01); *Y02E 10/28* (2013.01); *Y02E 10/721* (2013.01)

(58) Field of Classification Search
CPC ...... F03D 1/0633; F03B 17/061; F03B 1/025; F05B 2240/24; F05B 2210/16; F05B 2240/34; Y02E 10/28; Y02E 10/721

USPC .......................................................... 416/203
See application file for complete search history.

(56) References Cited

U.S. PATENT DOCUMENTS

| | | | | |
|---|---|---|---|---|
| 4,102,600 A | * | 7/1978 | Schwab | F01D 5/145 416/231 R |
| 4,687,416 A | * | 8/1987 | Spranger | B64C 11/18 416/200 R |
| 6,951,443 B1 | | 10/2005 | Blakemore | |
| 6,966,758 B2 | * | 11/2005 | Grabau | F01D 5/147 415/12 |
| 7,025,569 B2 | * | 4/2006 | Chang | F04D 29/681 416/183 |

(Continued)

FOREIGN PATENT DOCUMENTS

WO     WO 87-05666 A1     9/1987

*Primary Examiner* — Jessica Cahill
*Assistant Examiner* — Daphne M Barry
(74) *Attorney, Agent, or Firm* — Sandberg Phoenix & Von Gontard, P.C.

(57) ABSTRACT

Efficiency of a horizontal axis wind/water turbine (HAWT) is increased by the addition of a secondary blade associated with each main blade. The secondary blade is preferably a blade segment paralleling the main blade only in the outer reach of the main blade. The secondary blade travels rotationally ahead of the main blade and axially behind it, in an area in which air has not been disturbed by the main blades and in which disturbance of air by the secondary blade is not seen by the main blades. In one embodiment the secondary blade is carried by its associated main blade. In another embodiment, the secondary blades are carried by a ring or wheel which rotates with the main blades and the axle to which they are attached.

20 Claims, 8 Drawing Sheets

(56) References Cited

U.S. PATENT DOCUMENTS

| | | | |
|---|---|---|---|
| 7,581,926 B1* | 9/2009 | Dehlsen | F03D 7/0236 |
| | | | 416/1 |
| 7,708,530 B2 | 5/2010 | Wobben | |
| 7,956,484 B2 | 6/2011 | Stiesdal | |
| 7,993,103 B2 | 8/2011 | Cairo | |
| 8,657,572 B2 | 2/2014 | Presz, Jr. et al. | |
| 8,777,580 B2* | 7/2014 | Eisenberg | F03D 1/0633 |
| | | | 416/239 |
| 8,834,127 B2* | 9/2014 | Giguere | F03D 1/0633 |
| | | | 416/228 |
| 8,894,374 B2* | 11/2014 | Fuglsang | F03D 1/0641 |
| | | | 416/228 |
| 2010/0143152 A1* | 6/2010 | Subramanian | F03D 1/06 |
| | | | 416/90 R |
| 2011/0116923 A1* | 5/2011 | Larsen | F03B 3/121 |
| | | | 416/1 |
| 2011/0206509 A1* | 8/2011 | Benito Santiago | F03D 1/025 |
| | | | 416/23 |
| 2011/0223017 A1 | 9/2011 | Smith | |
| 2012/0269644 A1* | 10/2012 | Enevoldsen | F03D 1/065 |
| | | | 416/235 |
| 2013/0170990 A1* | 7/2013 | Birkestrand | F01D 7/00 |
| | | | 416/10 |
| 2013/0259642 A1* | 10/2013 | Seifert | B64C 21/04 |
| | | | 415/1 |
| 2014/0140846 A1* | 5/2014 | Birkestrand | F03B 17/061 |
| | | | 416/10 |
| 2014/0227100 A1* | 8/2014 | Godichon | F03B 3/126 |
| | | | 416/225 |
| 2014/0294592 A1* | 10/2014 | Drack | F03D 1/0633 |
| | | | 416/228 |
| 2015/0078913 A1* | 3/2015 | Enevoldsen | F03D 1/0608 |
| | | | 416/241 R |
| 2015/0098821 A1* | 4/2015 | Mayda | F03D 7/0232 |
| | | | 416/23 |
| 2015/0192105 A1* | 7/2015 | Chu | F03D 3/061 |
| | | | 416/119 |
| 2015/0211482 A1* | 7/2015 | Radisek | F03D 3/061 |
| | | | 416/135 |

* cited by examiner

FIG. 1

(PRIOR ART)

HORIZONTAL AXIS WIND OR WATER TURBINE WITH FORKED OR MULTI-BLADE UPPER SEGMENTS

CROSS REFERENCE TO RELATED APPLICATIONS

Priority is claimed to my U.S. Provisional Application Ser. No. 61/798,952, filed Mar. 15, 2013, and my U.S. Provisional Application Ser. No. 61/953,515, filed Mar. 14, 2014, the disclosures of which are hereby incorporated by reference.

STATEMENT REGARDING FEDERALLY SPONSORED RESEARCH OR DEVELOPMENT

Not applicable.

BACKGROUND OF THE INVENTION

This invention relates to horizontal-axis turbines. It has particular application to large wind turbines, although it is also useful with such turbines driven by other fluids, such as water. Such turbines include a number of blades, most commonly three, mounted to a horizontal shaft. For convenience, such turbines are referred to herein as horizontal axis wind/water turbines or HAWTs, regardless of the operating fluid.

The efficiencies of HAWTs in the "stand alone" or wind farm configurations have been improving for decades. Particularly in the last thirty years, the efficiency of the wind energy extraction was attempted by
  a) Increasing the number of blades. This never worked, the standard number now is three blades per rotor.
  b) Improving the aerodynamic efficiencies of blade design: Blade design is now almost perfected.
  c) Increasing the size of the blades (rotors): Blade size is now reaching the limits of practicality. The ever increasing blade sizes lead to great cost-efficiencies but present great structural problems. The cost-efficiencies are now off-set by the exponential cost increases of the blade attachments which would still allow the blade pitch dynamic adjustments. The forces which the pitch motors and gears have to overcome are enormous.

The scaling up efforts of the last thirty years are therefore now reaching their limits.

The size of utility scale HAWTs has grown enormously with intent to improve the cost of Kilowatt/hour produced. Scaling up takes advantage of the obvious economy of scale. The 5 Megawatt HAWTs currently installed have a rotor diameter larger than a football field. Each blade often exceeds 70 meters in length. New ways, rather than scaling up, need to be found to improve the single HAWT's power output. The limits imposed by structural material characteristics are now being approached. The transportation and assembly cost of such giant parts will also limit further future scaling-up efforts.

Numerous examples of such HAWTs have been described in the patent literature, including Stiesdal, U.S. Pat. No. 7,956,484, Cairo, U.S. Pat. No. 7,993,103, and Wobben, U.S. Pat. No. 7,708,530, for example.

Previous attempts have also been made to increase HAWT performance by adding one or more rotors. Decades ago, attempts were made to add another rotor on the same shaft. There have been many attempts to use an additional rotor or rotors behind the front rotor of HAWT wind turbines. The original reasoning for such dual rotor HAWTs was sound, since the second rotor would share the same rotational shaft, and would thus help to drive the attached single generator. The "power density" of two rotors per single tower would increase the overall power output of the wind farm without doubling the cost or doubling the land area required. The other cost-effectiveness would have been derived from sharing the same costly single tower and single nacelle. Recent attempts along these lines have been made by Danny J. Smith as exemplified in U.S. Published Patent Application No. 2011/0223017.

These attempts, however, have met with limited success. While theoretically possible, the diminished performance of the second rotor placed in the "downwash" of the first front rotor never justified the additional rotor cost and additional structural and coupling mechanisms costs of adding such a secondary rotor.

SUMMARY OF THE INVENTION

The present invention addresses the current limit of HAWT scaling up by adding a secondary or auxiliary blade associated with each main blade. The secondary blade is preferably a blade segment paralleling the main blade only in the outer reach of the main blade. The secondary blade travels rotationally ahead of the main blade and axially behind (downstream of) it, in an area in which air has not been disturbed by the main blades and in which disturbance of air by the secondary blade is not seen by the main blades.

The new blade extensions are preferably placed in the rotation plane just behind the plane of rotation of the primary rotor, but rotationally a short distance "in front" of its carrying (primary) blade. The inventor has noted that in the HAWT's immediate wake area, the wake turbulence stream direction follows the apparent wind direction, rather than the wind direction ahead of the HAWT. Such wake turbulence stream direction immediately following the blade is almost parallel with the rotation plane; that is, it is almost perpendicular to the "true wind" direction or to the rotational axis. This wake turbulence stream starts axially narrow, and expands axially as it spirals behind the blade.

The mounting of the secondary blade (blade extension) is done so the blade extension is always in the "sweet spot" untouched by any downwash rotor turbulence. The exact axial distance behind the main blade will be determined on a case-by-case basis, depending on blade size, number, and design, and may be determined by those skilled in the art with known computer simulations of blade wake. Typically the axial distance will be between one-half and six times the chord of the main blade, as measured at its radial midpoint. The secondary blade (blade extension) will likewise be positioned rotationally ahead a distance determined utilizing the same known computer simulations of blade wake. Typically it will be placed one-quarter to fifteen degrees rotationally ahead of the primary blade as measured at the distal end of the primary blade. In some embodiments this corresponds to a leading edge to leading edge distance of one to ten feet. The extension may extend beyond the sweep of the original ("main") HAWT blades, or it may extend equally with or to a lesser sweep diameter than the original HAWT blades.

In one embodiment the secondary blade (extension) is carried by its associated main blade. In one illustrative construction, the extension is mounted on the original blade like a bayonet on a rifle; the upper part of each of the HAWT rotor blades is forked in a way which will not interfere with or diminish the rotor performance. In another embodiment, the secondary blades are carried by a ring or wheel which rotates with the main blades and the axle to which they are attached. In yet another embodiment, complete secondary blades are provided, attached to the same hub as the primary blades.

In all the embodiments, both the main blades and the secondary blades are placed axially in front of the tower supporting the blades. In this respect, the design is different from the many attempts to add blades on the back of the tower.

The HAWT preferably has three blades, but it may have two or four blades. Although it is possible to utilize more than four blades in accordance with broader aspects of the invention, such embodiments are not preferred.

DESCRIPTION OF THE PREFERRED EMBODIMENTS

Figure 1:
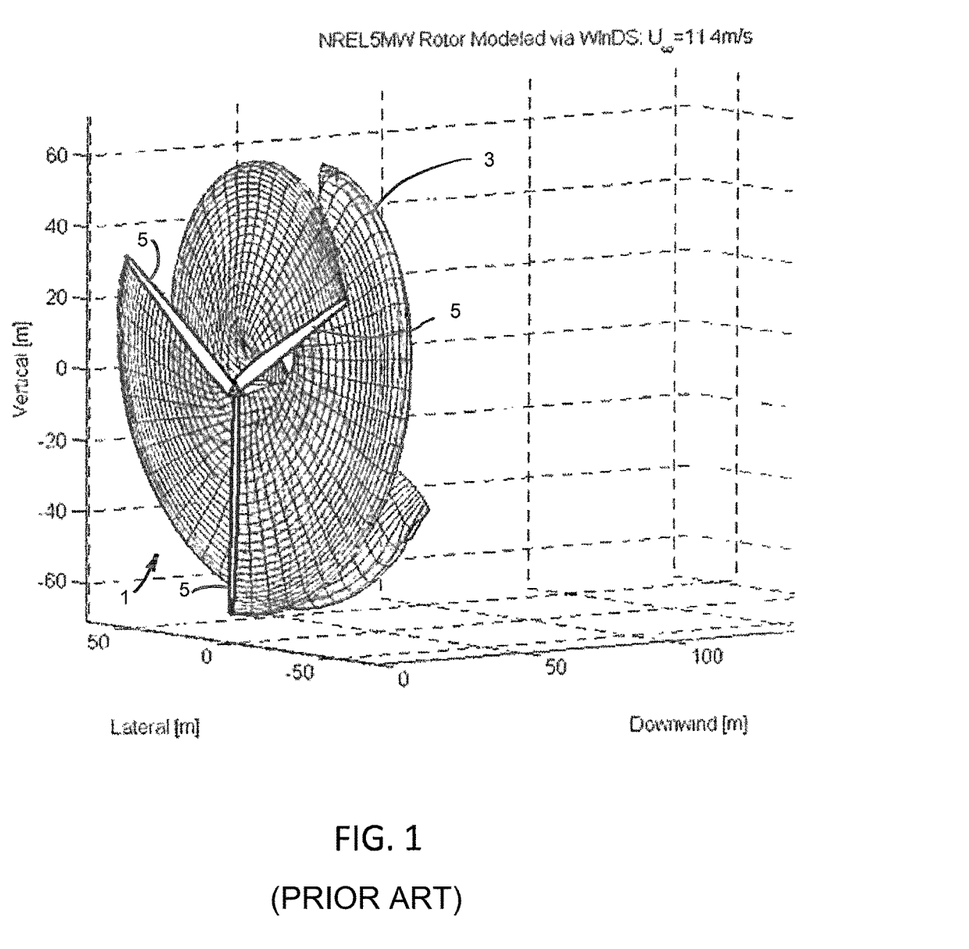
FIG. 1 is a diagrammatic view of a computer simulation showing the known wash patterns of a HAWT.

As shown in FIG. 1, a typical three-bladed HAWT 1 creates a turbulence pattern or wake 3 in the form of spiral turbulent flows which grow wider and more diffuse with distance behind the HAWT blades 5. The pattern in FIG. 1 is based on simulations made by the National Renewable Energy Laboratory (NREL), a branch of the U.S. Department of Energy. The wind speed is believed to be set at 11 meters/second.

Figure 2:
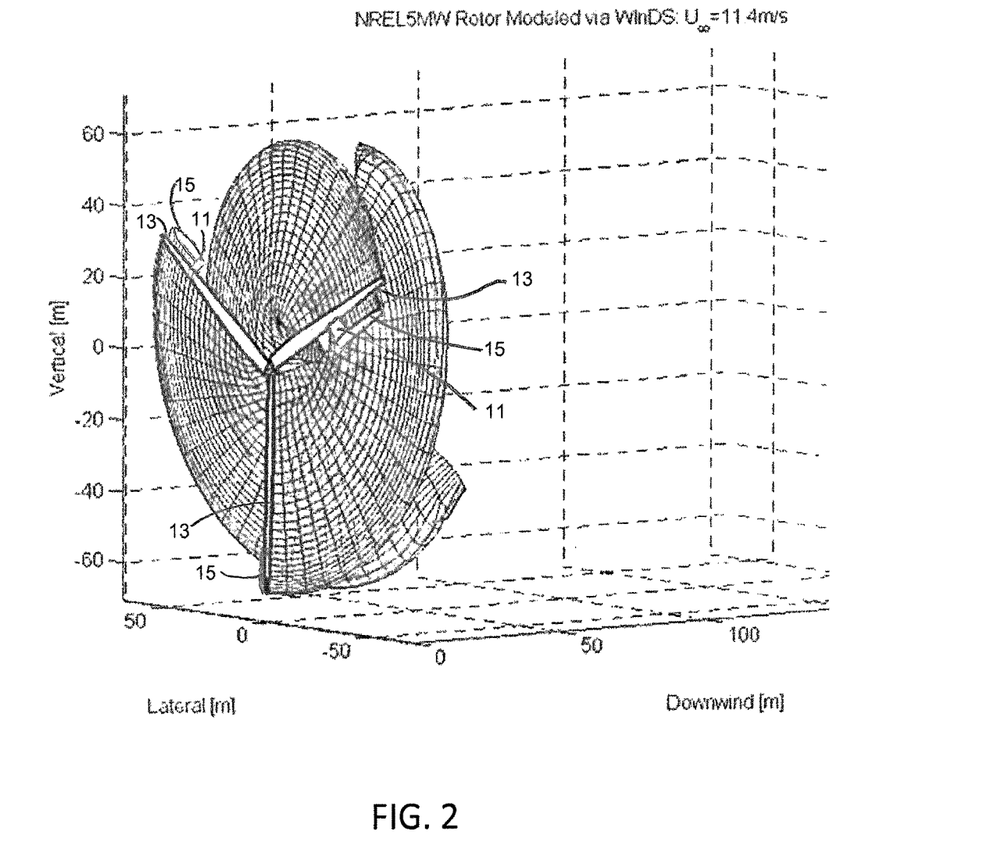
FIG. 2 is a schematic view showing an additional blade added to each of the blades of the HAWT of FIG. 1 in accordance with the present invention.
Figure 3:
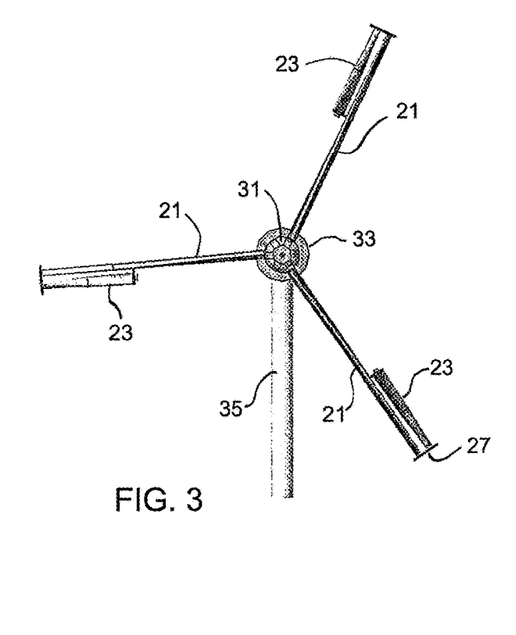
FIG. 3 is a view in partial front elevation of another embodiment of HAWT in accordance with the present invention.
Figure 4:
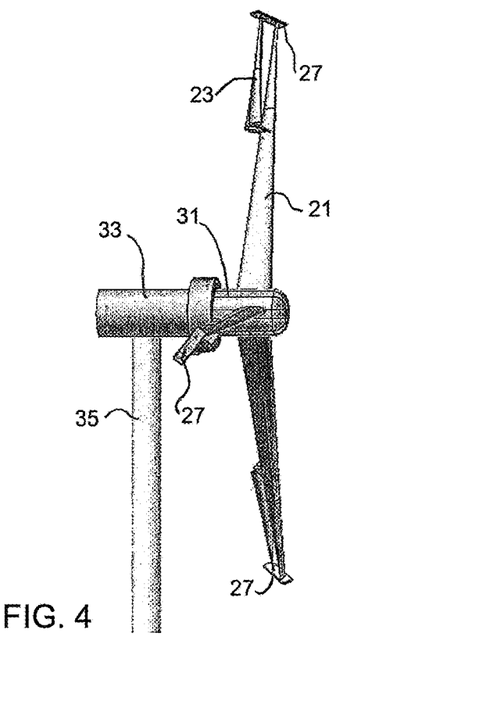
FIG. 4 is a view in side elevation of the HAWT of FIG. 3.
Figure 5:
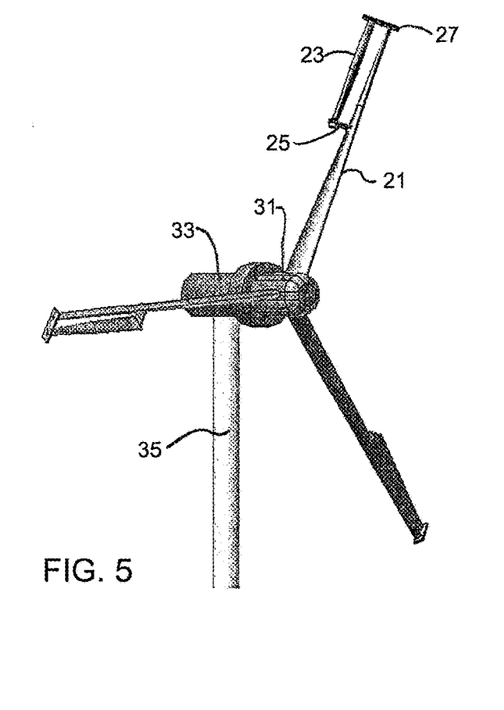
FIG. 5 is a view in perspective of the HAWT of FIGS. 3 and 4.
Figure 6:
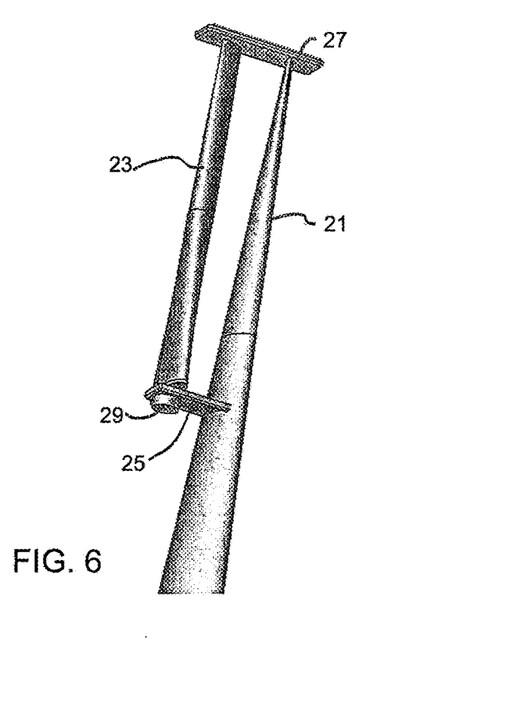
FIG. 6 is a view in perspective of a detail of distal blade ends of the main and secondary blades of the HAWT of FIGS. 3-5.

As shown in FIG. 2, the first embodiment of HAWT 1 of the present invention uses a strap connection 11 with each of the three blades 13 to mount a secondary blade segment 15 or extension blade five to thirty feet axially behind its associated blade 13 and five to ten degrees rotationally forward of the associated blade 13 as measured radially at the distal tip of the blade 13. The strap 11 is illustratively at the proximal end of the secondary blade 15 and is positioned somewhat more than half way out the primary blade 13. The secondary blade 15 is illustratively of similar profile to the outer portion of the associated primary blade 13 and is parallel to it. Being strapped to the primary blade 13, the secondary blade will change pitch with the primary blade 13, as that pitch is adjusted. The secondary blade 15 is thus positioned in an air space that is free of the turbulent wake of the preceding blade and in a position in which its own wake is not seen by its own associated blade.

If an observer is placed, say, 100 feet in front of the HAWT rotor on the HAWT's horizontal axis, looking downstream the wind stream, he will see:

a) three rotor primary blades as in the conventional HAWT.
b) a forked extension not exceeding half of the length of its carrying base (original) blade on each of these three blades. The secondary (extension or forked) blade will be mounted anywhere beyond the upper half point of the original blade.
c) the secondary blade extensions just behind the rotational plane of the primary "carrying" blades.
d) the secondary blade extensions just to the right of the upper primary "carrying" blades if the rotor rotates clockwise from his point of view.

The distance difference between the plane of the primary blades and the plane of the secondary blades has to be relatively small, so the downwash wind stream disturbance from the preceding forked blade or main blade is not 'caught' or experienced by the following ("forked") blade.

In other words, the horizontal axis distance between the blade extension and its carrying full length blade needs to be small enough not to be affected by the turbulence created by the (forked) blade rotating one hundred twenty degrees ahead of it, yet not so small that the frontal wave, created by the extension, affects its carrying blade rotating in the plane ahead of it. The typical axial distance between the front blades and their extensions will likely be recommended to be equal to one half to six, preferably two to five, times their chord width, measured at the midpoint of the carrying blade. The positioning of the blade extension above will insure that the "sweet spot" just behind the rotating primary blades is utilized by the blade extensions. Yet the blade extensions do not interfere with or alter in any way the virgin wind stream "seen" or experienced by their original blade "carriers."

The three additional blade extensions do not interfere with the wind energy extraction performance of the three primary blades, yet contribute additional performance. That they do by extracting the rest of the virgin wind stream, which would have otherwise passed by the primary blades unutilized.

The observation of the "sweet undisturbed spot" in otherwise turbulent wind "downwash" created by the primary 3 blades forms a part of the present invention. This sweet spot size is different for the case of 2-, 3-, or 4-bladed HAWT Wind Turbines.

As previously indicated, the present invention is useable with power-generating turbines utilizing different operating fluids than air. Thus, a secondary blade of a three- or four-bladed hydro turbine may be positioned in the "sweet undisturbed spot" in otherwise turbulent water "downwash" created by a primary blade. This sweet spot size is different for the case of 2-, 3-, or 4-bladed hydro-turbines.

While the extension could be as long as the carrying blades, the preferred implementation is to limit the length of the extension blade to less than half of the carrying blade. This is the most cost-effective approach since any rotating blade is most effective at its upper third, which moves at the highest speed. For example, the midpoint blade area moves twice as slow as the blade tip. The force produced by the blade is exponentially proportional to its speed (as per the lift equation of aerodynamic science).

Figures 16, 17:
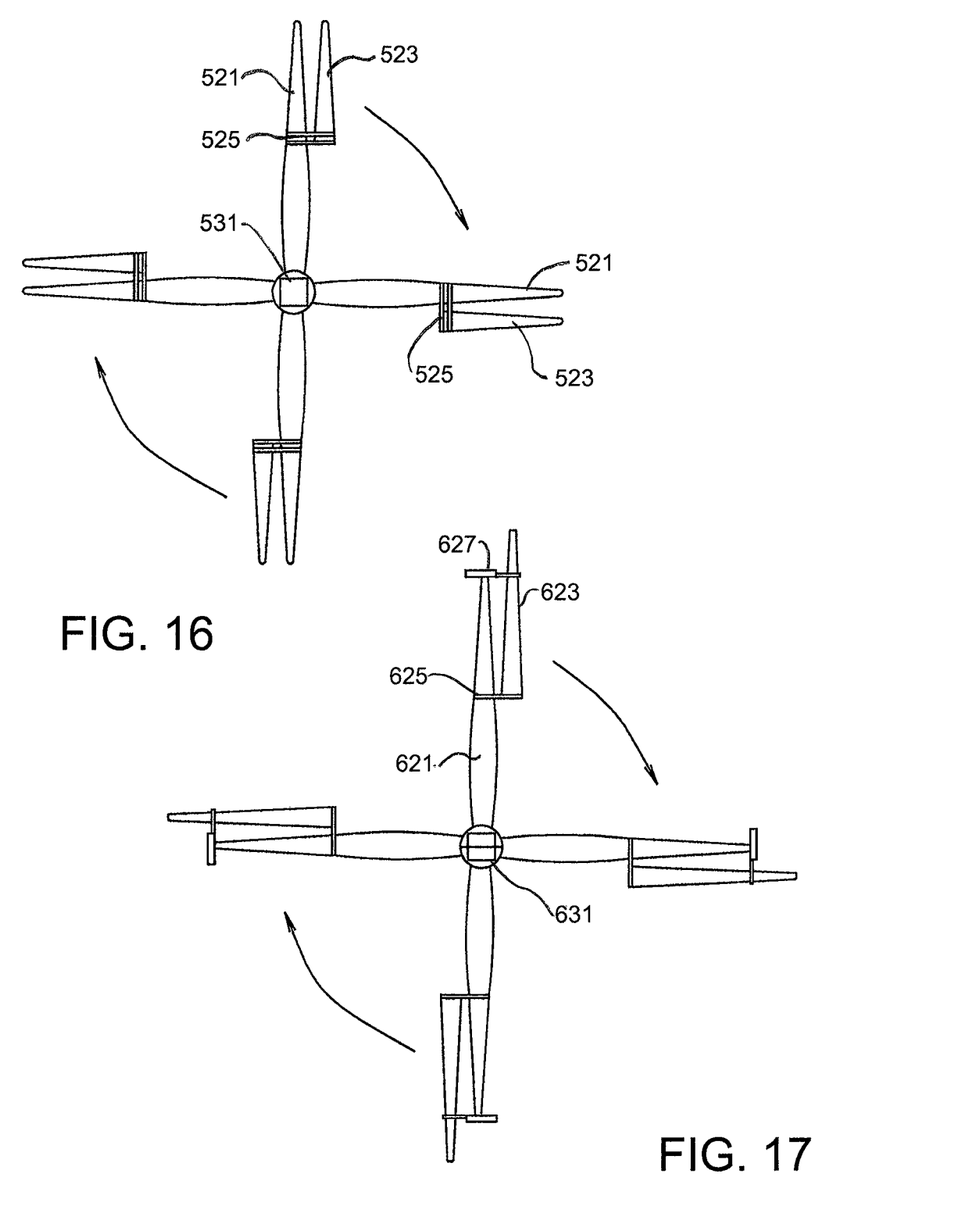
FIG. 16 is a view in front elevation of the rotor portion of another embodiment of HAWT in accordance with the present invention.
FIG. 17 is a view in front elevation of the rotor portion of another embodiment of HAWT in accordance with the present invention.
Figure 18:
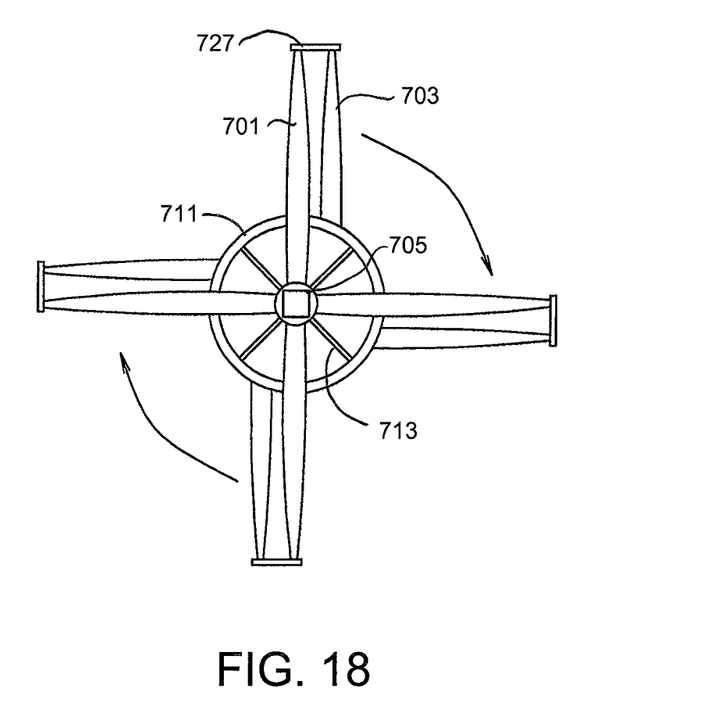
FIG. 18 is a view in front elevation of the rotor portion of another embodiment of HAWT in accordance with the present invention.

More leeway in such positioning will be available in case of the 2-bladed HAWTs, rather than the most common 3-bladed HAWTs. In rare case of the 4-bladed HAWTs there will be less freedom to position the blade extensions; FIGS. 16-18 show such an arrangement.

It will be seen that the additional (secondary or auxiliary) blade segments preferably have axes parallel to the axes of the primary blades. Their axes therefore generally do not extend through the rotational axis of the turbine.

A second embodiment is shown in FIGS. 3-6, in which the turbine is rotating counterclockwise as viewed from the upwind side. This embodiment differs from the first embodiment of FIG. 2 primarily in that a secondary blade segment 23 is attached to each main blade 21 by a tab 25 welded to the main blade beyond the midpoint of the main blade 21 and also by a winglet 27 at the tip of each blade 21 and 23. A connection, shown illustratively as a positioning motor 29, connects the blade segment 23 parallel to the main blade 21.

The addition of winglets 27 at the distal ends of the main blades 21 and the auxiliary blade segments 23 not only increases efficiency by reducing blade tip vortex shedding but also provides a stiffening plate for the blades and blade segments, reducing their tendency to bend.

In this embodiment, the blade segment 23 has the same contour and is made of the same material as the main blade 21. As indicated in these figures, the main blades 21 are connected to a hub 31 by a standard connection permitting the pitch of the blades 21, hence of the blade segments 23, to be adjusted remotely. The hub 31 is connected to a nacelle 33, mounted for rotation on a support pole 35. The nacelle 33 houses the connections of the turbine blades to an electric generator, which may be in the nacelle or may be on the ground, connected to the turbine blades by a gear train.

In the preceding illustrative embodiments, the bayonet-like attachment of the additional blade segments to the three original HAWT blades puts additional (cantilevered) stress on the primary HAWT blades. Essentially, these additional blade segments ride "piggy-back" style on the original full length HAWT blades. The advantage of this approach is that these segments will automatically follow the pitch changes performed by the pitch gear of every original HAWT blade. However, the disadvantage of such piggy-back attachment is perhaps excessive cantilevered stress on the pitch gears which are at the root of each original full length blade, right at the hub (nacelle). These pitch gears are already subject to enormous cantilevered stresses caused by the full lengths blades alone. Piggy-backing an additional blade segment on each blade only increases the stresses and wear and tear on the pitch gear cogs, as well as the additional stresses on the entire root attachment of each blade.

Figure 7:
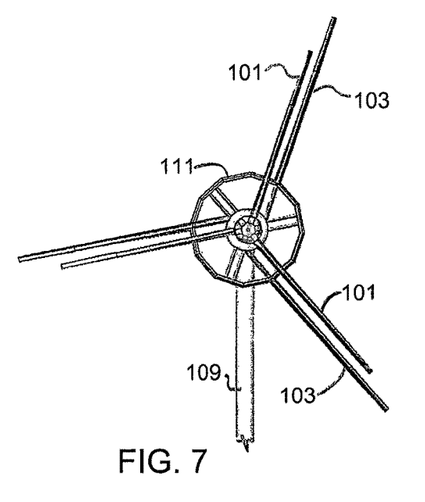
FIG. 7 is a view in partial front elevation of another embodiment of HAWT in accordance with the present invention.
Figure 8:
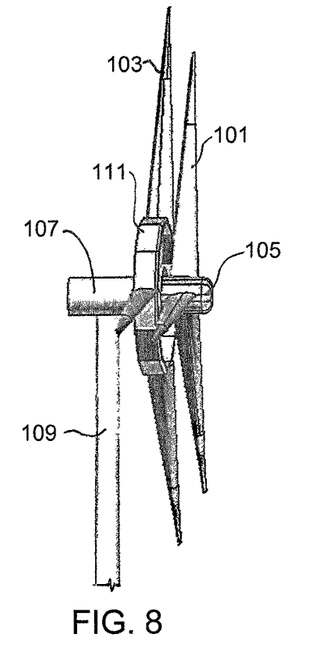
FIG. 8 is a view in side elevation of the HAWT of FIG. 7.
Figure 9:
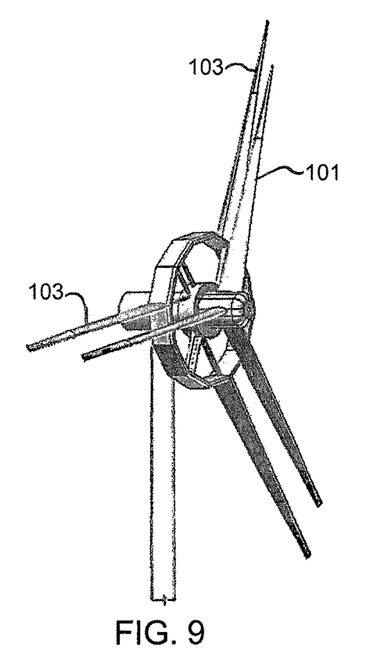
FIG. 9 is a view in perspective of the HAWT of FIGS. 7 and 8.
Figure 10:
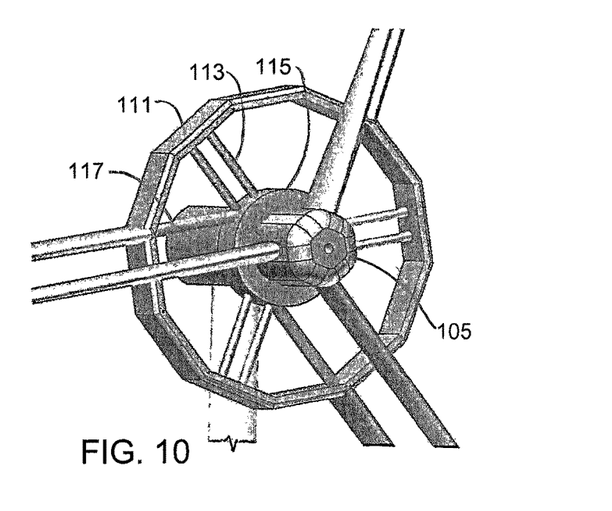
FIG. 10 is a view in perspective of a detail of proximal blade ends of the main and secondary blades of the HAWT of FIGS. 7-9.

As shown in FIGS. 7-10, an alternative blade segment attachment mechanism does not add additional stress on the root attachments (including pitch gears) of the original full length blades 101 but does add blade segments 103 parallel to the original full-length blades 101. The main blades 101 are attached to a hub 105 of the rotor in conventional manner. The rotor is attached to a nacelle 107 rotatably mounted on a vertical support tower 109. The blade segments 103 in this illustrative embodiment are given a sweep diameter greater than that of the original blades 101. As seen from upstream, as shown in FIG. 7, the wind turbine of this embodiment rotates clockwise.

Additional blade attachments 103 are attached to a large diameter (typically one-quarter to half of the HAWT rotor diameter) hollow drum or large diameter metal wheel 111 with its spokes 113 attached to a hub 115 of the main shaft of the rotor. The hub 115 rotates with the hub 105 to which the main blades 101 are attached. Such hollow drum or wheel 111 provides an alternative attachment platform for the additional three blade segments 103. Importantly, this blade-segment-platform wheel rotates synchronously in the plane parallel with, but somewhat behind, the primary HAWT three-bladed rotor. Conveniently, the hub 115 is physically rigidly connected to the hub 105, or both are rigidly connected to a common shaft.

A somewhat similar drum or wheel is shown in Blakemore, U.S. Pat. No. 6,951,443 and in Hydro Mécanique Research S.A., PCT publication WO 87/05666A1. As with the blades in these approaches, the secondary blade segment of this embodiment may be reduced to a circular cross-section as it passes through the wheel, to allow rotation to be controlled at the hub of the HAWT or by connection to the main blade. Conveniently, the entire length of the secondary blade segment between the wheel 111 and hub 115 is circular in cross-section, so as to reduce turbulence in the center of the rotor. The proximal end 117 of the secondary blade segment 103 is mounted at a non-radial angle to the hub 115, so that the main blade and its associated blade segment 103 are parallel.

The wheel 111 may, if desired, have a contour which deflects or channels wind energy for desired purposes such as creating a venturi or smoothing air flow as in Presz, Jr. et al., U.S. Pat. No. 8,657,572.

Placing this segment attachment wheel behind the original rotor insures exactly the same positioning of the additional segment blades relative to the primary HAWT rotor. Thus, aerodynamically, the blade attachments behave or perform exactly the same way as described with respect to the first embodiment. Although the extraction of the wind energy would be exactly the same, the attachment of the additional blade segments to the wheel totally mechanically decouples the additional blade segments from the original full length HAWT blades. This results in relieving the original HAWT blades from the additional cantilevered stresses on their root attachments. Therefore, the HAWT will essentially have two rotors rotating in unison with identical RPM. It will of course be understood that the two rotors may be integrated on a single hub.

The wheel 111 conveniently engages the blades 101 and strengthens them against flexing rearwardly.

The blade segment-carrying hollow drum (wheel) 111 can also carry magnets (illustratively permanent neodymium magnets) for a direct-drive electricity generator. Such a large diameter rotating magnet platform is essentially the generator's rotor part, with the non-rotating (generally wound)

stator coils being mounted in a shroud or nacelle. The mechanisms for maintaining a proper air gap, for mounting the magnets and coils, and for regulating power from the device are well known and easily adapted to this design. Use of a direct drive generator rather than using a gearbox (such as a planetary gear train) to drive a remote generator eliminates an Achilles heel of early large or small HAWTs. For example, a 5 megawatt wind turbine can rotate with a maximum of about 7 to 10 RPM and still create the required relative movement between rotor magnets and stator coils, rather than the hundreds of RPMs required by conventional generators. Large modern wind turbines eliminate the gear box and make the nacelle "fatter" so its large diameter will allow housing of an inside large diameter wheel carrying the magnets. The wheel of the present embodiment is even larger, and will require a special shroud to protect the magnets and coils from weather.

The addition of winglets at the distal ends of the main blades and the auxiliary blade segments would not only increase efficiency by reducing blade tip vortex shedding but would also provide a stiffening plate for the blades, reducing their tendency to bend. It will be understood that the connection of the winglet to at least one of the main blade and the secondary blade will allow relative rotation of the blades to alter their pitch, either individually or in tandem.

Figure 11:
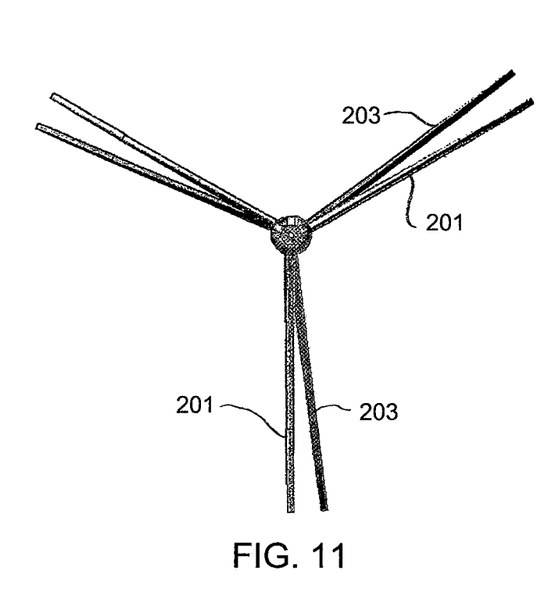
FIG. 11 is a view in front elevation of the rotor portion of another embodiment of HAWT in accordance with the present invention.
Figure 12:
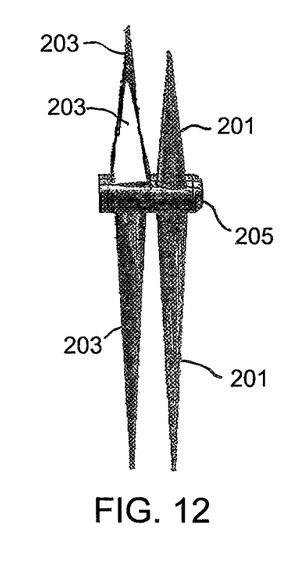
FIG. 12 is a view in side elevation of the HAWT rotor of FIG. 11.
Figure 13:
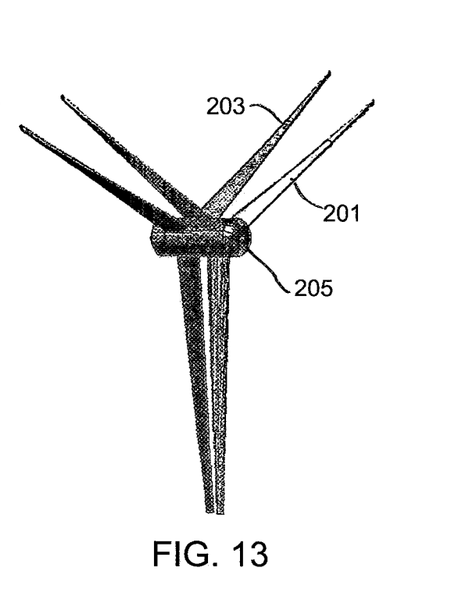
FIG. 13 is a view in perspective of the HAWT rotor of FIGS. 11 and 12.

As shown in FIGS. 11-13, in another embodiment, the secondary blades 203 are merely a second set of full blades identical with the main blades 201, but spaced axially behind the main blades two to twenty feet and set rotationally slightly ahead of the main blades, which are illustratively set to rotate counterclockwise. Because the blades are all mounted radially to the same shaft 205, the axial and rotational spacing between them is fixed, but the blades are not exactly parallel. The secondary blades 203 precede the primary blades 201 rotationally by about five to ten degrees. Therefore, as used herein, the term "generally parallel" includes lines which are skewed up to ten degrees relative to each other. The term "substantially parallel," however, means parallel within plus or minus two degrees. In this illustrative embodiment, the secondary blades 203 are set ten feet (axis to axis) axially behind the main blades 201 and are set 7° rotationally ahead of the main blades 201.

Figure 14:
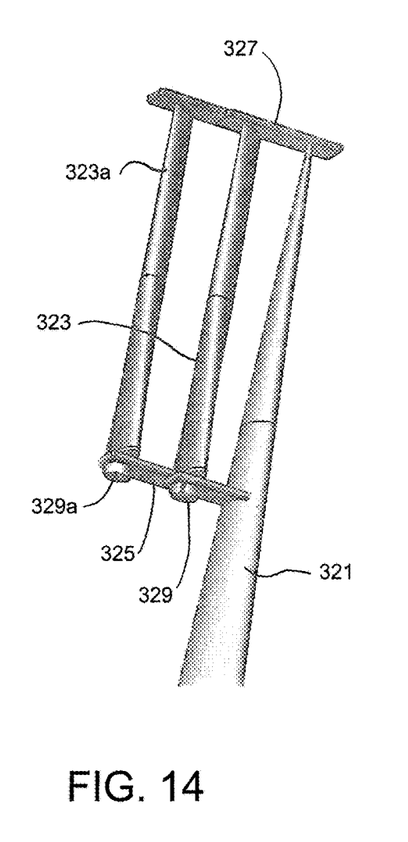
FIG. 14 is a view in perspective of distal blade ends of the main and two secondary blades of an embodiment of HAWT in accordance with the present invention.

As seen in FIG. 14 it is possible to utilize two secondary blades or blade segments. In FIG. 14, the blade is rotating toward the viewer, the wind is blowing right to left, and the portions of the view to the left are closest to the viewer. In a variation on the embodiment of FIGS. 3-6, in addition to the secondary blade segment 323 attached to elongated tab 325, a second secondary blade segment 323a is attached to the tab 325 on the outer portion of the main blade 321. The pitch of each blade segment 323 and 323a is controlled by motors 329 and 329a drawing their power from wiring running through the main blade 321. The distal ends of both blade segments 323 and 323a are rotatably attached to winglet 327 which reduces blade tip shedding and increases lift. The blades are positioned and spaced to avoid mutual interference, and in particular to avoid the wake turbulence caused by the other blades in the associated group. The clear space between each adjacent pair of blades should be at least their chord length at any span point. This spacing is similar to that employed by biplanes and triplanes.

Figure 15:
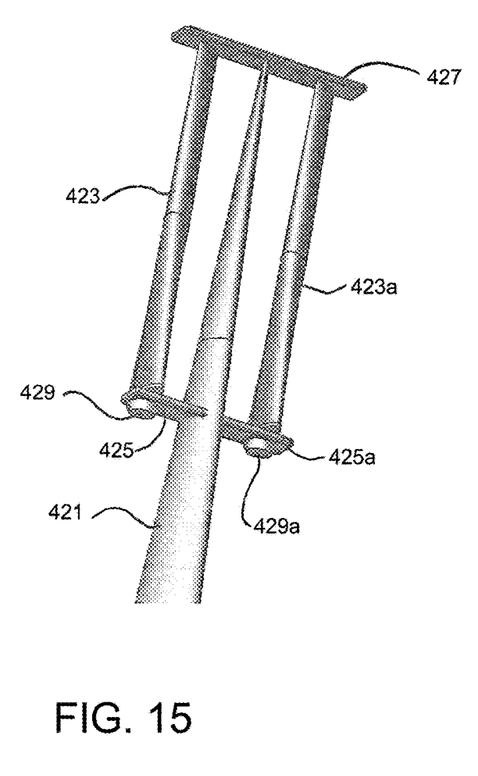
FIG. 15 is a view in perspective of distal blade ends of the main and two secondary blades of another embodiment of HAWT in accordance with the present invention.

FIG. 15 shows an embodiment similar to those of FIG. 14 and FIGS. 3-6, except one blade segment 423a is positioned axially ahead of the main blade 421 and rotationally a few degrees, preferably less than 10°, behind the main blade 421. The blade segment 423a is held between tab 425a and winglet 427. The winglet 427 is also attached to the distal ends of a blade segment 423 and main blade 421. Positioning motors 429 and 429a adjust the pitches of blade segments 423 and 423a respectively. It will be seen that placing the blade segment axially ahead of the main blade and rotationally behind it is equivalent to the preceding illustrative embodiments in which the blade segment is placed axially behind the main blade and rotationally ahead of it. This is particularly so when the main blade and the blade segment have the same configuration.

As used herein, the axial distances between blades and the radial separation of the blades are taken with respect to a long axis of each blade. Where the main blades and secondary blades have a similar shape, this is equivalent to the spacing between leading edges of the blades.

Numerous variations in the horizontal axis wind or water turbine of the invention will occur to those skilled in the art in light of the foregoing disclosure.

As shown in FIGS. 16-18, the turbine may have four blades rather than three. These blades and their secondary blades are numbered analogously to the three-bladed embodiments which they resemble.

An embodiment in which two sets of secondary blades or blade segments are utilized in a construction like that of FIGS. 7-10 can easily be envisaged. In such an embodiment, the drum carries six additional segments, rather than three additional segments. This could be accomplished by extending the depth of the hollow drum or wheel blade segment carrying platform, so it can accommodate the three additional segments behind the three additional "front" segments. These blade segments may or may not have their own pitching mechanism as is typical for the blades carried by the primary rotor. The positioning of the first and second rotor blade segments would insure that these segments will encounter only the non-turbulent part of the wind stream, not yet corrupted by the wake downwash created by the ahead positioned full length blades of the primary rotor or the first blade segments.

The additional (secondary or auxiliary) blades or blade segments may be made of different materials than the main blades. They may be formed to different aerodynamic shapes. The blade segments may have different attachment mechanisms to place them in the "sweet spot" substantially unaffected by the flow of fluid past the primary blades. The shapes and structures of the blades and other parts may be varied. The electrical generating systems may be varied. When the operating fluid is water, the turbine device may be mounted in a river or bay to utilize currents and tides, either on a permanent base or suspended from pontoons.

These variations are merely illustrative.

All patents and published applications mentioned herein are hereby incorporated by reference.

The invention claimed is:

1. A wind or water turbine having a plurality of main blades rotating about a horizontal axis, each of said main blades having an extension blade attached thereto at an attachment point spaced distally from a proximal end of the main blade and extending from the attachment point to a point closer to a distal end of the main blade than to the proximal end of the main blade, the extension blade being positioned either rotationally ahead of and axially behind said main blade or rotationally behind and axially ahead of said main blade and extending into an area to avoid the wake turbulence caused by the other blades, the extension blade's wake turbulence being avoided by the other blades.

2. The turbine of claim 1 wherein each said main blade has a long axis, a distal tip of the extension blade being displaced between two degrees and fifteen degrees ahead of said long axis of its said main blade.

3. The turbine of claim 1 wherein the turbine has exactly three main blades and either three or six extension blades.

4. The turbine of claim 3 wherein the turbine has exactly three extension blades.

5. The turbine of claim 1 wherein each extension blade extends at least as far radially as distal blade tips of the main blades, each extension blade having a total length between 25% and 75% of a main blade.

6. The turbine of claim 1 wherein each said extension blade is spaced axially between two and five chords of a main blade from its said main blade.

7. The turbine of claim 1 wherein each said extension blade has a longitudinal long axis and is arranged to change pitch by rotating about said long axis.

8. The turbine of claim 7 wherein each said extension blade is arranged to change pitch to match a pitch of its said main blade.

9. A wind or water turbine comprising two, three, or four main blades rotating about a horizontal axis in a first plane, and an equal number of extension blades rotating in a second plane spaced axially from said first plane, each extension blade being associated with a main blade and extending generally parallel with said main blade along at least a part of a distal half of the main blade and extending into an area substantially free of turbulence caused by the main blades, each said extension blade being spaced axially from its said main blade by a distance between one half and six chords of said main blade, as measured at the midlength of said main blade.

10. The turbine of claim 9 wherein a proximal end of each said extension blade is connected to its said main blade by a structural connection at a position in the distal half of the main blade.

11. The turbine of claim 10 wherein said structural connection is spaced from a distal blade tip of said main blade.

12. The turbine of claim 10 wherein each said extension blade is connected to its said main blade by a winglet at the distal blade tip of said main blade.

13. The turbine of claim 9 wherein each said extension blade is carried by a wheel rotating in unison with the main blades.

14. The turbine of claim 13 wherein the wheel has a radius between 25% and 50% of the length of a said main blade.

15. The turbine of claim 14 wherein each said extension blade is connected to its said main blade by a winglet at the blade tip of said main blade.

16. The turbine of claim 9 further comprising magnets carried by a structure to which at least some of said blades are attached, the magnets interacting with coils to generate electricity.

17. The turbine of claim 9 wherein each extension blade is either rotationally ahead of and axially behind its associated main blade or rotationally behind and axially ahead of its associated main blade.

18. A wind or water turbine having a tower and exactly two, three, or four outwardly extending main blades, the main blades being mounted to a hub rotatably mounted to the tower for rotation about a generally horizontal axis, each main blade having associated therewith a secondary blade positioned closer to its associated main blade than to any other main blade, the main blades and the secondary blades all being mounted on an upstream side of the tower with respect to flowing air or water causing the blades to rotate, the secondary blades extending at least as far from said hub as do their associated main blades, each secondary blade extending into an area substantially free of turbulence caused by the main blades, each said secondary blade being spaced axially from its said main blade.

19. The turbine of claim 18 wherein the secondary blades are positioned such that their wake and the wake of the main blades do not interact with any trailing blades to a degree which appreciably affects efficiency of the turbine.

20. The turbine of claim 18 wherein the turbine generates electricity.

\* \* \* \* \*